(12) United States Patent
Lupu et al.

(10) Patent No.: US 7,032,213 B1
(45) Date of Patent: *Apr. 18, 2006

(54) FIXING INCOMPATIBLE APPLICATIONS USING A LIGHT DEBUGGER

(75) Inventors: Corneliu I. Lupu, Redmond, WA (US); John D. Colleran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,512

(22) Filed: Apr. 6, 2000

Related U.S. Application Data

(60) Provisional application No. 60/151,854, filed on Sep. 1, 1999.

(51) Int. Cl.
*G06F 9/44* (2006.01)

(52) U.S. Cl. .................................................. 717/129

(58) Field of Classification Search ........ 717/168–178, 717/100–118, 124–130, 140–154; 709/328; 707/100; 714/28, 31, 38, 45, 35, 54; 719/321, 719/323, 328, 331
See application file for complete search history.

(56) References Cited

U.S. PATENT DOCUMENTS

| | | | | |
|---|---|---|---|---|
| 5,335,344 A * | 8/1994 | Hastings | ...................... | 714/35 |
| 5,430,878 A * | 7/1995 | Straub et al. | ................ | 717/162 |
| 5,450,586 A * | 9/1995 | Kuzara et al. | ............... | 717/124 |
| 5,473,777 A * | 12/1995 | Moeller et al. | ............. | 709/328 |
| 5,675,803 A * | 10/1997 | Preisler et al. | .............. | 717/131 |
| 5,790,856 A * | 8/1998 | Lillich | ......................... | 717/163 |
| 5,815,722 A * | 9/1998 | Kalwitz et al. | ............. | 717/178 |
| 5,901,315 A * | 5/1999 | Edwards et al. | ............ | 717/124 |
| 5,951,639 A * | 9/1999 | MacInnis | ..................... | 725/70 |
| 6,035,426 A * | 3/2000 | Applegate | .................... | 714/54 |
| 6,071,317 A * | 6/2000 | Nagel | .......................... | 717/128 |
| 6,138,271 A * | 10/2000 | Keeley | ........................ | 717/140 |
| 6,141,698 A * | 10/2000 | Krishnan et al. | ........... | 709/331 |
| 6,263,456 B1 * | 7/2001 | Boxall et al. | ................. | 714/31 |
| 6,463,583 B1 * | 10/2002 | Hammond | ................... | 717/162 |
| 6,484,309 B1 * | 11/2002 | Nowlin et al. | .............. | 717/100 |
| 6,745,385 B1 * | 6/2004 | Lupu et al. | .................. | 717/163 |
| 2002/0073398 A1 * | 6/2002 | Tinker | ......................... | 717/110 |

OTHER PUBLICATIONS

Stone, "In memory patching: three approaches", (how to introduce breakpoints in an automated debugger and other marvels), Mar. 1998, <http://fravia.anticrack.de/stone1.htm>.*

* cited by examiner

*Primary Examiner*—Todd Ingberg
*Assistant Examiner*—Tuan A. Vu
(74) *Attorney, Agent, or Firm*—Christensen, O'Connor, Johnson Kindness PLLC

(57) ABSTRACT

A computer method for patching applications that are incompatible with an operating system is provided. The method determines if an application is compatible with an operating system, and if the application is determined to be incompatible, a debugger is loaded that runs the incompatible application. The debugger calls a handler to patch the incompatibilities of the application when a breakpoint has been reached in the incompatible application during the running of the incompatible application.

12 Claims, 6 Drawing Sheets

FIXING INCOMPATIBLE APPLICATIONS USING A LIGHT DEBUGGER

RELATIONSHIP TO OTHER APPLICATIONS

This application claims the benefit of U.S. Provisional Application Ser. No. 60/151,854, filed Sep. 1, 1999.

FIELD OF THE INVENTION

The present invention relates to software, and more specifically, to making incompatible software applications compatible with an operating system.

BACKGROUND OF THE INVENTION

In today's rapidly moving software field many applications are programmed specifically for the operating system in use at the time the application is developed. While programming specifications are typically provided to application developers by the operating system developers, sometimes these procedures and rules are not followed. As a result, many applications may not work correctly under a new release of an operating system. This can result from many different factors, including application developers' not following the programming specifications provided by the operating system developers or application developers' making assumptions about how the operating system operates which turn out to be incorrect. For example, an application developer may believe that a certain type of file is always stored at a specific location in the computer, and, instead of requesting the location of the file from a function in the operating system, as the programming specifications indicate, the programmer will, contrary to the teaching of the programming specification, specifically input the path of the file location into the application code. Additionally, a programmer may rely on the fact that a certain function of the existing operating system only returns a certain value if an error occurs within that function, which may not be true in a new or new version of the operating system. For example, if previous versions of the operating system returned a value of negative one to indicate an error, a programmer may assume that only a negative one value will be returned in the future. An operating system change, however, may have modified the function to return other values based on the error, thereby potentially causing the program to not work correctly in all situations under the operating system.

In other instances, a program may seem to operate correctly under one version of an operating system even though it contains errors. This can occur when the older version of the operating system does not detect or enforce the error contained within the application. A new release of the operating system, however, may check for these previously unchecked conditions, thereby causing the application to be incompatible with the new version of the operating system.

The problem of incompatible applications also increases as the popularity of the operating system increases. For example, if an operating system has become popular during its release, there will be thousands of applications written specifically for that operating system. The large number of applications, as well as the diverse group of application developers, can result in many programs not working correctly when a new version of an operating system is released.

Users of currently working applications may not want to switch to a newer operating system if their applications are incompatible with the new operating system. To attempt to solve this problem, application developers have been required to fix their applications themselves, or operating system developers have included patches that are integrated into the new version of the operating system to fix many of the known problem applications so that they will function correctly under the new operating system.

The operating system patch approach, however, creates many problems. First, patches may add a significant amount of code to the operating system that may significantly increase the space requirements of the operating system. Second, with patches, all applications are required to operate through this additional patch layer even though many applications are compatible with the new operating system and thus do not need the patches to properly operate. This can cause programs to run slower. Third, the operating system programming code may become very cluttered due to the number of programs that may need to be fixed. This cluttered code makes it more difficult for operating system developers to change and improve the operating system. Finally, it is impossible for an operating system developer to know all of the applications that exist that will not work correctly when the new operating system is first released. Therefore, subsequent patches must be made to the operating system in order to allow these programs to work correctly. This in turn adds another layer to the already complex operating system causing the operating system to operate in a less efficient manner.

SUMMARY OF THE INVENTION

The present invention is directed to providing a system and method for patching applications that would not otherwise be compatible with the operating system on which the application is run. In one embodiment of the present invention, a debugger is run that executes and appropriately patches the incompatible application. The debugger application loads a dynamic link library (DLL) containing patches for the functions that are incompatible with the operating system. If an application runs properly under the operating system, the debugger application and associated DLL is not loaded. Therefore, applications that work correctly under the operating system are not required to go through an additional level of execution of the debugger application.

One embodiment of the invention works in the following way. First, the user starts an application. Second, the application is identified as being compatible or incompatible with the operating system. To determine whether or not the application is compatible with the operating system, identifying information from the application is checked against a database containing a list of applications that are currently known to be incompatible. If the name of the application is found to be contained within the database, then a set of attributes are checked to see if that particular version of the application is incompatible. If all the attributes that are checked match the ones in the database then the application is found to be incompatible with the current operating system. If the application name is not found in the database, the application is found to be compatible with the current operating system. Third, the application is either run with a debugger or directly without a debugger, depending on the application's compatibility with the operating system.

If the application is found to be incompatible with the operating system, the operating system starts a debugger application that, in turn, runs the incompatible application. Before loading the incompatible application, the debugger loads a DLL that contains patches for the incompatible functions within the application. Specifically, the DLL contains a list of breakpoints specifying the location where the application needs to be patched together with the appropriate code required to patch the application.

When the debugger loads the DLL, a function is called that sets the breakpoints within the incompatible application. A breakpoint may be specified by: (1) the module name and function name; (2) the module name and a memory offset; or (3) an address. The debugger also implements a handler that is capable of modifying the application code that is incompatible. In one embodiment of the invention, the debugger handler is capable of reading and writing memory within the incompatible application. Therefore, the handler is capable of modifying the incompatible code or inserting code into the application to fix the problem code contained within the application. For example, when the debugger reaches a breakpoint within the application, a handler may be called that merely skips a portion of the incompatible code or the handler may rewrite a portion of code to contain a certain value in order to make the application compatible with the operating system.

One of the benefits of the use of a debugger application to patch incompatible applications is that it is very robust. The debugger is capable of monitoring every step an application takes while it is executing. Additionally, the amount of code required to patch an application is generally very small, such as 200 bytes. This small amount of code makes patches easily accessible to a user either through a website or file transfer protocol (FT) site.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a computer method and system for patching incompatible applications. More specifically, the invention is ideally suited for use in patching applications that would not otherwise work properly under an operating system running on the computer executing the application. Briefly described, the invention first identifies applications as being compatible or incompatible with the operating system, and if the application is determined to be incompatible, starting a debugger application that, in turn, runs the incompatible application.

Figure 1:
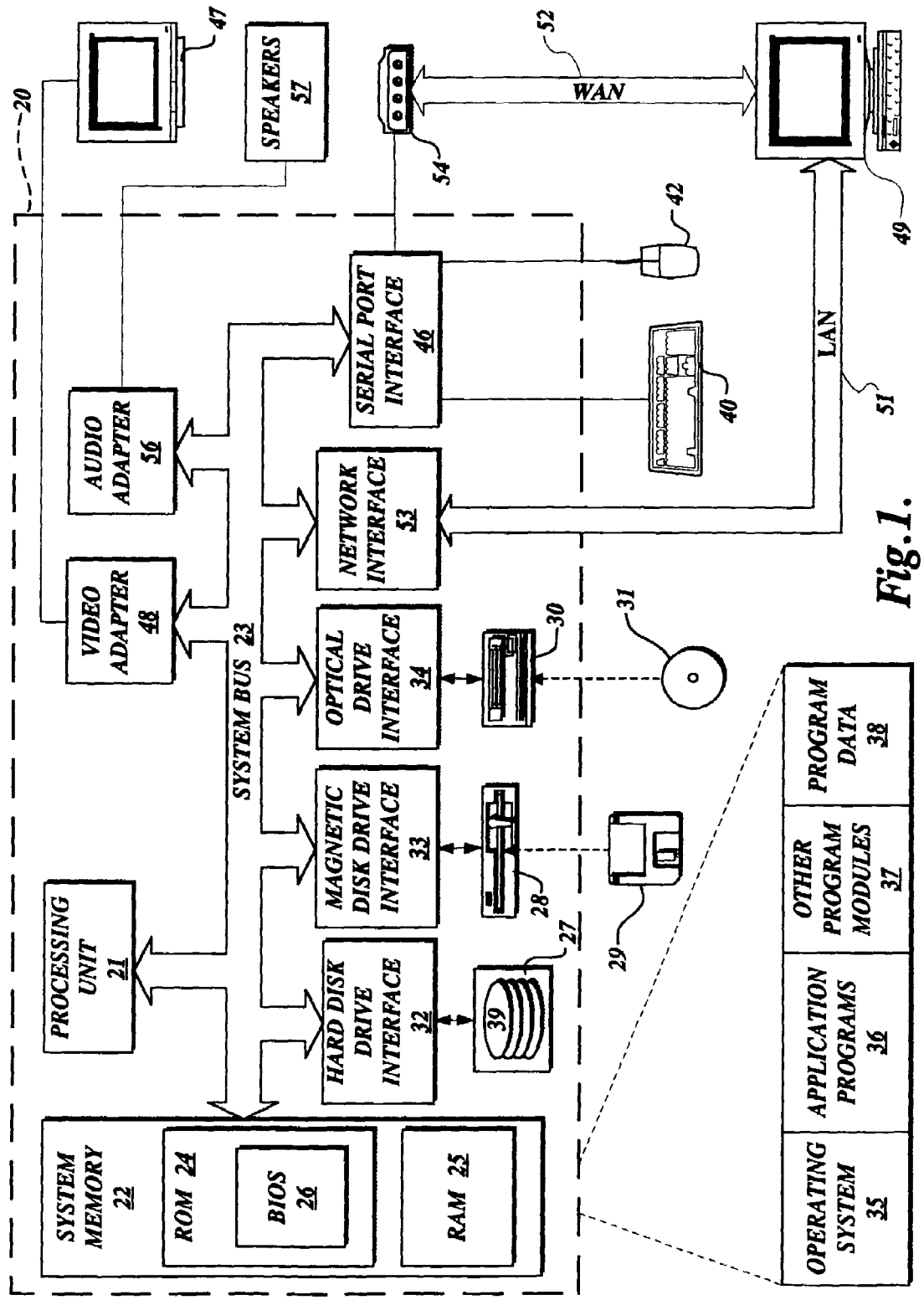
FIG. 1 is a block diagram of a computer suitable for providing an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may also be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
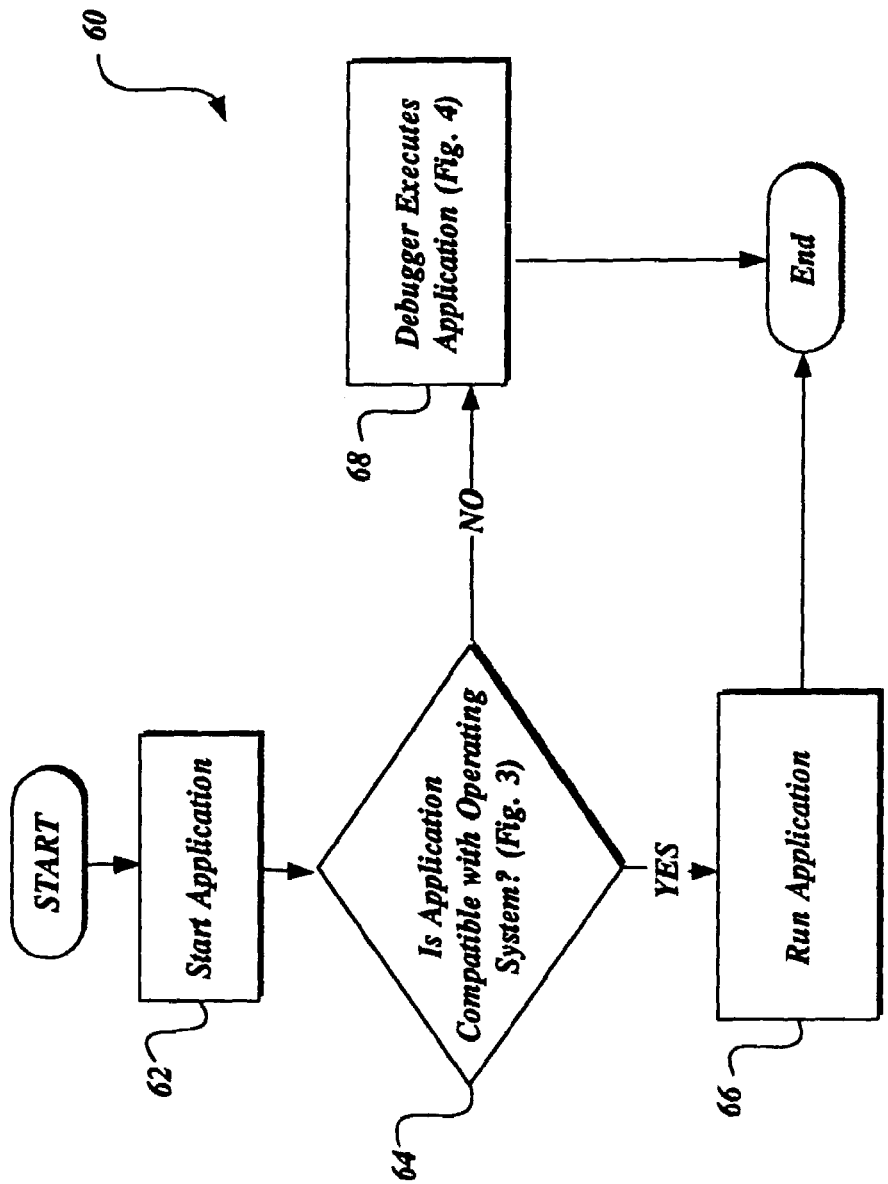
FIG. 2 is an overview flow diagram for implementing one embodiment of the invention.
Figure 3:
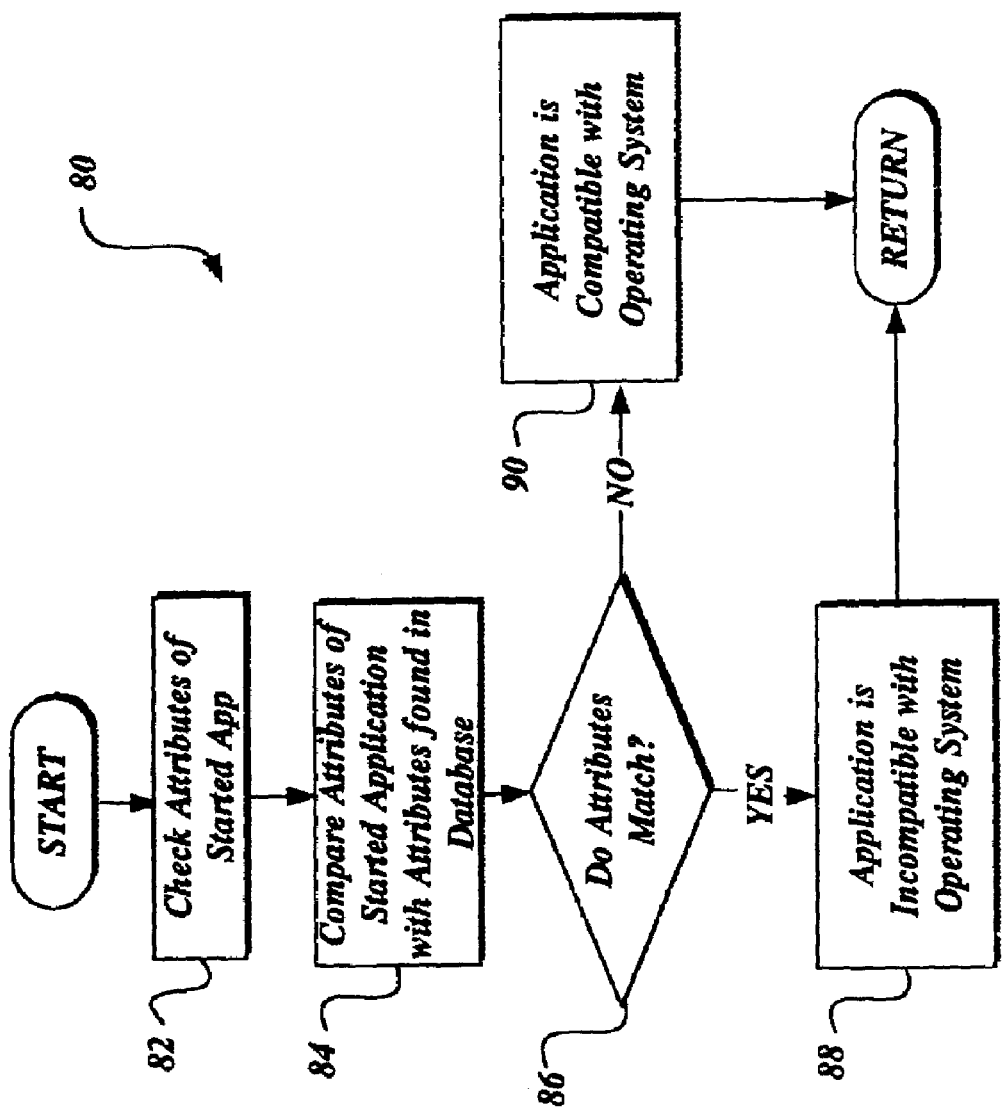
FIG. 3 is a flow diagram illustrating how an application is determined to be compatible or incompatible with an operating system.
Figure 4:
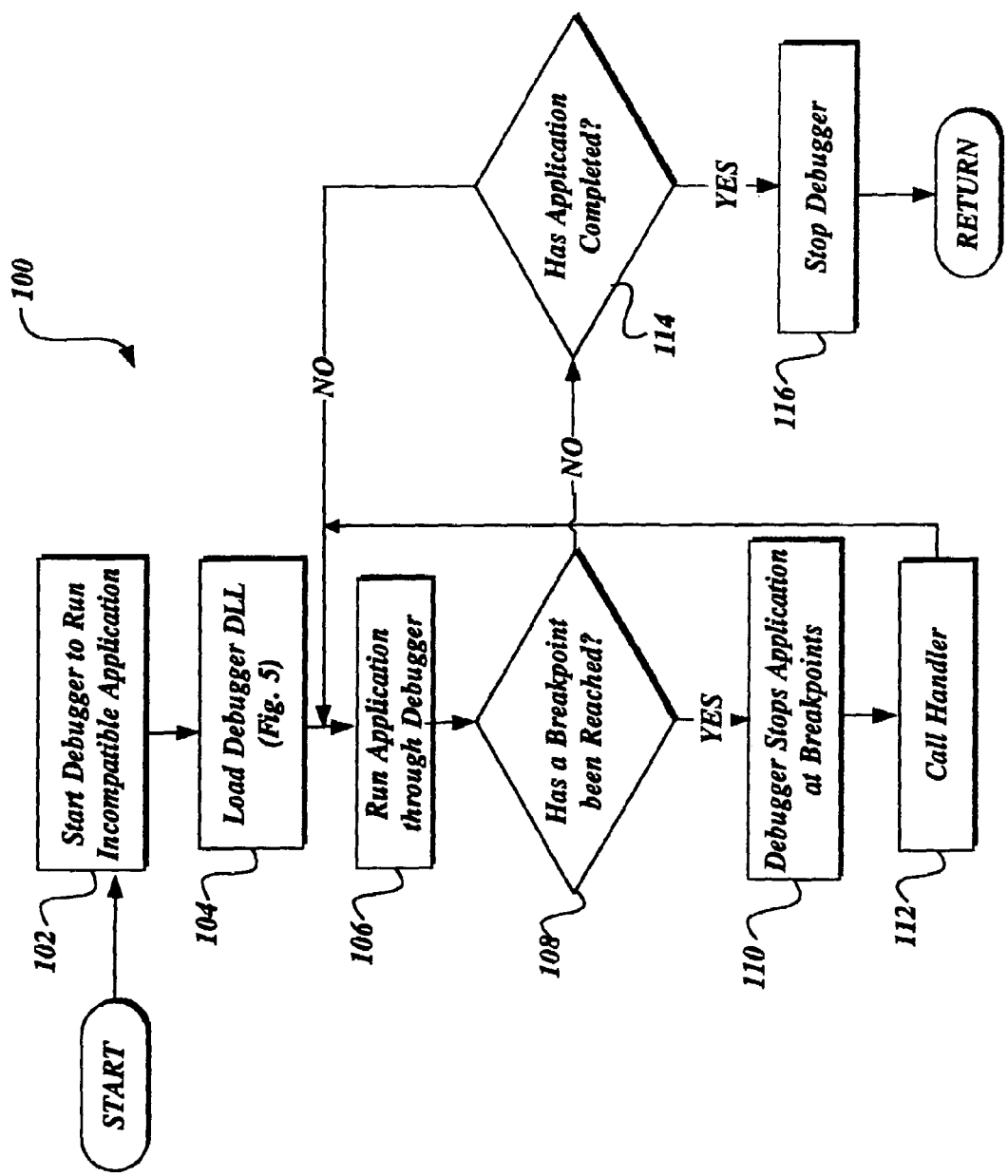
FIG. 4 is a flow diagram illustrating the logic of how an incompatible application is patched using a debugger.
Figure 5:
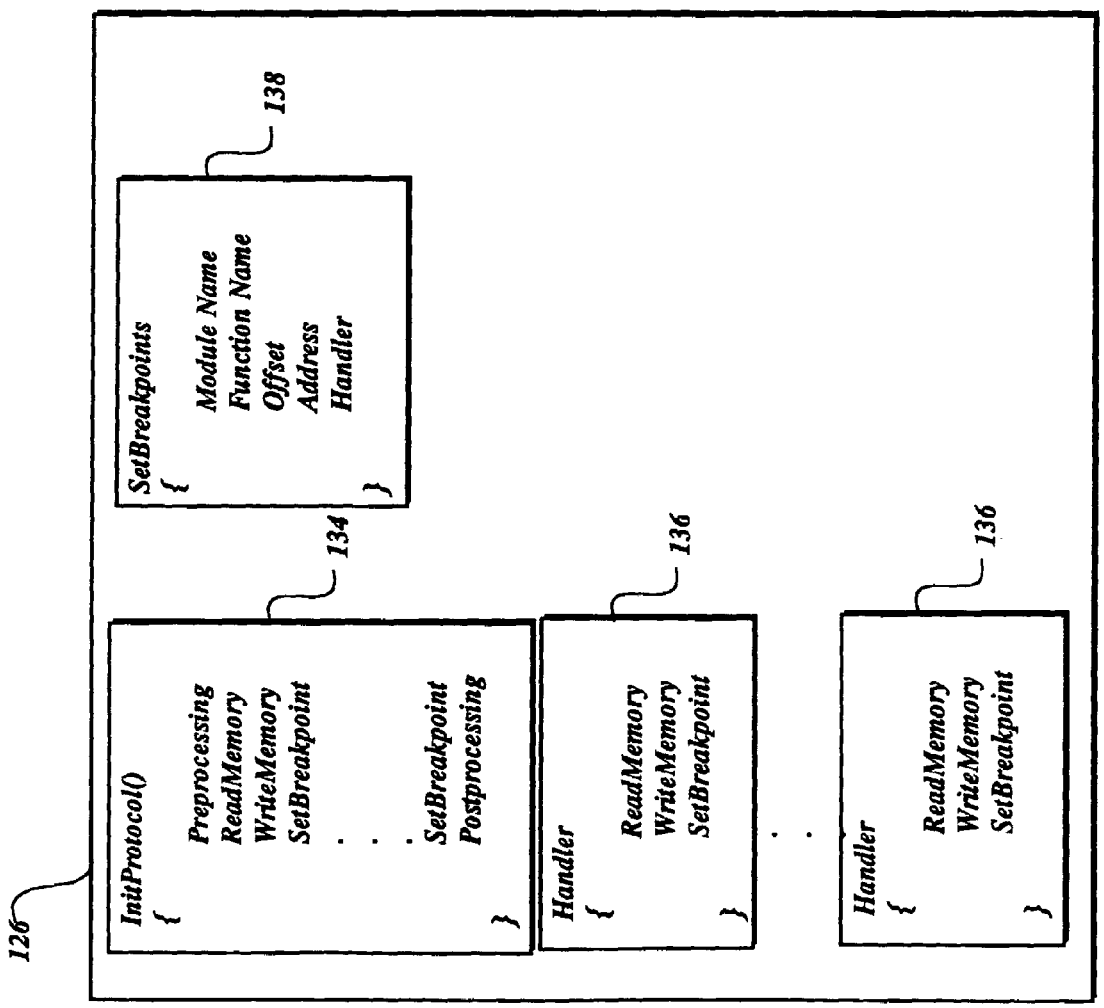
FIG. 5 is an exemplary pseudo-code diagram of a debugger DLL.

The present invention is best described by reference to FIGS. 2–5, which graphically illustrate one embodiment of the present invention. FIGS. 2–4 illustrate the logic performed in determining an application's compatibility with an operating system and running a debugger in order to patch an incompatible application. FIG. 5 is a diagram of pseudo-code of a debugger DLL for one embodiment of the invention.

FIG. 2 is a flowchart illustrating an overview of the present invention. Block 62 illustrates starting an application. At block 64, a determination is made as to whether or not the application is compatible with the operating system. In one embodiment of the present invention, the operating system makes this determination. It will be appreciated by those of ordinary skill in the art that an application can be compatible with an operating system on varying levels. For example, an incompatible application may cause the operating system to halt the computer, or the incompatible application may operate as if the application contains no incompatibilities until a specified event that is unlikely to happen occurs. Therefore, an incompatible application is defined as an application that is identified as not working properly under an operating system. As will be appreciated by those of ordinary skill in the art, many applications could be identified as incompatible under this definition. In one embodiment of the invention, the application is identified as an incompatible application before the application begins to execute its program code. If the operating system determines that the application is compatible, the application is run normally, as indicated by block 66. Otherwise, if the application is determined to be incompatible, the operating system loads a debugger that is used to patch the incompatible application, as indicated by block 68. The application then runs until termination.

FIG. 3 illustrates in more detail the functions performed by decision block 64 of FIG. 2. More specifically, FIG. 3 is a flowchart illustrating one embodiment of the present invention for determining whether or not an application is compatible with the operating system of the computer that is to execute the application. Initially, at block 82, at least one identifying attribute, such as the name, of the started application is checked by the operating system. Other identifying attributes that can be checked, include but are not limited to: the version number of the header; the version number of the application; the company name; the checksum of the application; the release date of the application; the size of the application; the first six bytes of the application; or any other attribute that could be used to aid in identifying the application. As will be appreciated by those of ordinary skill in the art, any attribute or attributes can be chosen that uniquely identify the application.

Next, at block 84, the attributes of the started application are compared by the operating system with the attributes of applications that have been determined to be incompatible. In one embodiment of the present invention, some of the incompatible applications' attributes are stored in a database, specifically the Windows registry. It will be appreciated by those of ordinary skill in the art that the attributes could be stored at many different locations. For example, the attributes could be stored on the hard disk drive of the user's personal computer. Alternatively, the attributes could be stored at a remote location, such as a web server or remote host. When stored remotely, the identifying attributes can be downloaded through the Internet to the user's computer, or even read directly from a remote host. Still further, the identifying attributes could be stored on an optical or magnetic disk, or as mentioned above on a web server of a remote host. In one embodiment of the present invention, the database includes names of applications that are currently known to be incompatible with the operating system along with other identifying information. It will be appreciated by those of ordinary skill in the art that there are many tools that can be used to edit the registry database, including regedit.exe or regedit32.exe. By using these tools, or similar tools, the user can enter the incompatible application's identifying attributes into the registry.

The started application is determined to be incompatible with the current operating system if the identifying attributes of the started application are the same as the attributes of the identified incompatible applications. As mentioned above, in one embodiment of the present invention, the first identifying attribute compared is the name of the started application. The application is determined to be compatible with the current operating system if the name of the application does not match any of the names contained within the database. If the name of the started application matches the name contained within the database, additional identifying attributes are checked to determine if the application is incompatible with the operating system. It will be appreciated by those of ordinary skill in the art that an application can be identified many different ways and, as mentioned above, the set of identifying attributes compared could include many different identifying parameters. In some situations, one identifying attribute is sufficient to uniquely identify the incompatible application.

In one actual embodiment of the present invention, the identifying attributes are represented by binary data within the database. The first several bytes indicate the size of the identifying attributes that follow. It will be appreciated that the identifying attributes can be stored in an ASCII format, or some other computer readable format.

After the attributes have been checked (block 82) and compared (block 84) a test is made (decision block 86) to determine if the attributes of the started application match the attributes contained within the database. If the attributes that are compared match, as indicated by block 88, the application is determined to be incompatible with the operating system. If the attributes do not match as indicated by block 90, the application is determined to be compatible with the operating system. If the application is determined to be compatible, the application runs normally. Otherwise, the application is incompatible, as indicated by block 88 and as shown in FIG. 2 and noted above (block 68), the operating system loads a debugger to patch the incompatible application. FIG. 4 illustrates in more detail the process of loading a debugger.

FIG. 4 is a flow diagram illustrating the logic employed by one embodiment of the present invention to patch an incompatible application using a debugger. At block 102, the operating system starts a debugger to run an incompatible application. This occurs after the application is determined to be incompatible with the operating system (See FIG. 3). In one actual embodiment of the invention, starting the debugger comprises passing as the debugger's command line the name of the incompatible application's executable, the name of the DLL containing the patches for the incompatible application, and the command line required to run the incompatible application.

In one actual embodiment of the invention, after the debugger is started, as indicated by block 104, the debugger loads a dynamic link library (DLL), referred to as the debugger DLL, that is specific to the application and contains patches for the incompatible functions within the application. Specifically, the debugger DLL contains a list of breakpoints specifying a location where the application needs to be patched, together with the appropriate code required to patch the incompatible application. After the debugger DLL is loaded, the breakpoints within the application are set. As will be appreciated by those of ordinary skill in the art, the breakpoints and the debugger DLL patch code could be stored in many different ways. For example, the information could be stored in a text file located on the user's computer or stored at a remote location. Additionally, the information could be stored within the debugger application itself.

The debugger also implements a handler that is capable of modifying the application code that is incompatible. In one embodiment of the invention, the debugger handler is capable of reading and writing memory within the incompatible application. Therefore, the handler is capable of modifying the incompatible code or inserting code into the application to patch the problem code contained within the application.

After the breakpoints have been set within the incompatible application, the application is run through the debugger as indicated by block 106. In one embodiment of the invention, the debugger starts the incompatible application by using the incompatible application's command line parameters that were passed to the debugger when the debugger was initially started.

As indicated by block 108, the debugger determines if a breakpoint has been reached within the incompatible application while it is running. If the debugger has not reached a breakpoint, a determination is made, as indicated by block 114, as to whether the application has completed running. If the application has completed running, the debugger is stopped as indicated by block 116. Otherwise, the application continues to run through the debugger, as indicated by block 106. If a breakpoint has been reached, the debugger stops the incompatible application at the breakpoint, as indicated by block 110, and calls a handler, as indicated by block 112, that patches the incompatible code.

The handler is capable of modifying the application code that is incompatible. In one actual embodiment of the invention, the handler is capable of reading and writing memory within the incompatible application. Therefore, the handler is capable of modifying the incompatible code or inserting code into the application to patch the problem code contained within the application. For example, when a debugger reaches a breakpoint within the application, a handler may be called that merely skips a portion of the incompatible code, or the handler may rewrite a portion of the code to contain a certain value in order to make the application compatible with the operating system. As will be appreciated by those of ordinary skill in the art, the debugger handler could be capable of modifying the code in many different ways. For example, there are many debuggers available on the commercial market that allow a user to adjust many different parameters within the application being debugged. For example, the debugger could allow the user to manually enter instructions into the debugger to change the application's executable program steps interactively.

As will be appreciated by those of ordinary skill in the art, one of the benefits of using a debugger to patch incompatible applications is that debuggers are generally very robust. In one actual embodiment of the invention, the debugger is capable of monitoring every step an application takes while it is running. An additional benefit to using a debugger is that the amount of code required to patch an application is generally very small, such as 200 bytes. The small amount of code makes patches easily accessible to a user. For example, in one embodiment of the invention the user could access the patches through a Web site or an FTP site.

Once the handler has completed patching that part of the application, the application continues to run through the debugger, as indicated by block 106, until completion.

FIG. 5 is an exemplary pseudo-code diagram 126 of a debugger DLL. In one actual embodiment of the present invention, a function named InitProtocol 134 is contained within the debugger DLL. The InitProtocol function 134 contains the information necessary to set the breakpoints within the application, as well as provides a function pointer to a function to handle the breakpoint. The InitProtocol function 134 may do some preprocessing before setting any breakpoints within the application. For example, this preprocessing could include reading a value of a parameter. The InitProtocol function 134 will also set a breakpoint in the application that will cause the application to stop at the specified location. Box 124 illustrates that the debugger DLL contains the information required to specify the location of the breakpoint (See FIG. 6). After setting the breakpoint, the InitProtocol function 134 could do some postprocessing to the incompatible application.

In addition to the InitProtocol function 134 and SetBreakpoint functions 138 (See also boxes 128, 130, and 132 in FIG. 6), the debugger DLL 126 contains the functions used to handle the breakpoints. The handler functions 136 contain the necessary program code to patch the incompatible functions. As will be appreciated by those of ordinary skill in the art, the handler functions can dynamically set breakpoints when called.

Figure 6:
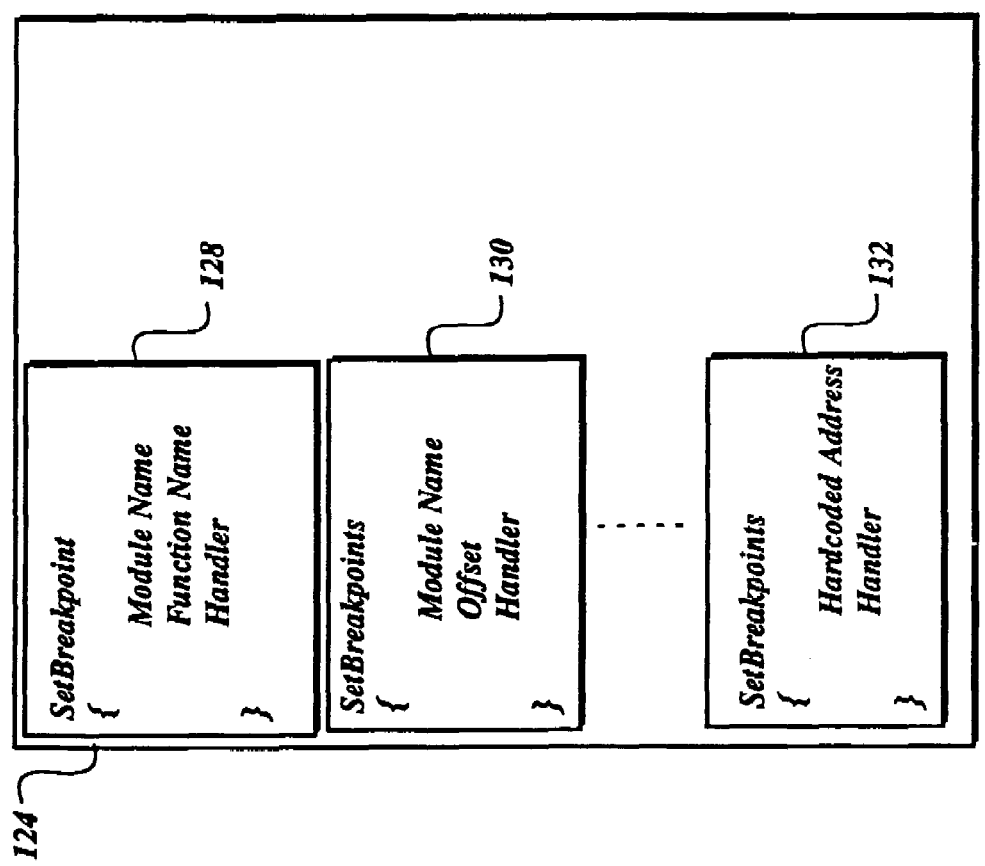
FIG. 6 is an exemplary diagram illustrating three different ways of setting breakpoints.

FIG. 6 is an exemplary diagram 124 that illustrates three different ways of specifying breakpoints, illustrated by separate boxes 128, 130, and 132. Box 128 indicates that a breakpoint may be specified by indicating the module name containing the incompatible function as well as the function name that is incompatible. In one embodiment of the present invention, the module name is the name of the DLL containing the incompatible function(s). As shown in FIG. 5, after specifying the breakpoint, the handler function 136 for the breakpoint is specified. Returning to FIG. 6, box 130 indicates that a breakpoint may be specified by indicating the module name containing the incompatible function, as well as an offset distance within the module. Box 132 indicates that a breakpoint may be specified by indicating the hardcoded address of the breakpoint within the application's address space. As will be appreciated by those of ordinary skill in the art, a hardcoded address may be determined at runtime of the application. As will be appreciated by those of ordinary skill in the art, there are many different ways of setting breakpoints within an application. All that is required is that the manner of setting the breakpoint specifies to the debugger the location of where to stop the application in order to fix the application. The following example further illustrates the operation of the debugger application.

The example is based on a user's need to install a printer having custom paper size support, but when the user attempts to install the printer, a bug is exposed in the manufacturer's installation program preventing the user from using the custom paper size. In order to fix this problem, the manufacturer, or some other knowledgeable party, may create a debugger DLL, which in this example will be referred to as the "patch.dll," containing the breakpoints and handlers necessary to patch the incompatibility. In this example, the problem that causes the incompatibility is an invalid return value by the function DriveDeviceCapabilities. In order to patch the incompatibility in this example, the return value of the DriveDeviceCapabilities must be patched by the debugger to return a compatible value when the custom paper size printer is being installed. Therefore, the installation program first determines what printer is being installed. If the custom paper size printer is being installed, the return value of the incompatible application is changed to a compatible value. More specifically, the InitProtocol function specifies the name of the DLL containing the incompatible function, the "printer.dll," the name of the incompatible function, "DeviceCapabilities," as well as the handler function that is called when the breakpoint reaches the named function, "DeviceCapabilitiesHandler." Once the breakpoint has been set by the debugger and the handler specified, the application is run. When the incompatible application reaches the DeviceCapabilities function, the debugger calls the DeviceCapabilitiesHandler. In this example, the DeviceCapabilitiesHandler determines if the user is trying to install the printer using the custom paper size, and if so, reads the return address of the incompatible function DeviceCapabilities so that it can set a breakpoint at this address. As described above, the breakpoint can be set by specifying a hardcoded address. In this instance, the hardcoded address is the value read by the DeviceCapabilitiesHandler using the function ReadMemory. In addition to specifying the address for the breakpoint, the handler "ReturnDeviceCapabilitiesHandler" is specified. The ReturnDeviceCapabilitiesHandler is called when the incompatible function is about to return the incompatible value. As mentioned above, without this handler, the incompatible function would cause the program to crash in this particular example. Therefore, the ReturnDeviceCapabilitiesHandler reads the last device ID and checks to see if it has a value of 0x7FFF which if returned to the application would cause the program to crash. If the value equals 0x7FFF, the handler replaces the value with a compatible value by using the WriteMemory function to write a different value into the return value of the incompatible function. As will be appreciated by the foregoing example, the debugger and associated handlers and breakpoints within the application can be constructed in a very precise manner in order to correct an incompatibility. Once the incompatible functions are patched, the application is run through the debugger until completion.

As mentioned above, in one embodiment of the present invention, the debugger is capable of reading memory and writing memory by using the functions ReadMemory and WriteMemory. In one actual embodiment of the invention, four arguments are supplied to ReadMemory, including the handle of the process being debugged, the address desired to be read, a buffer to store the information to be read, and the length of the information to be read. As will be appreciated by those of ordinary skill in the art, the buffer should be of sufficient size to store the information being read. Similarly, WriteMemory uses the same four arguments as ReadMemory. As will be appreciated by those of ordinary skill in the art, these functions could be implemented in many different ways. For example, the arguments to these functions could be contained within a single structure.

While the preferred embodiment of the invention has been illustrated and described, it will be appreciated that various changes can be made therein without departing from the spirit and scope of the invention.

The invention claimed is:

1. A method for patching a computer application program including a plurality of executable steps, comprising:
   (a) determining whether or not the computer application program is compatible with a computer operating system executing the computer application program; and
   (b) if the computer application program is determined to be incompatible with the computer operating system ("incompatible application"), starting a debugger to run the incompatible application, the debugger performing the steps of:
      (i) loading a debugger dynamic link library containing a list of breakpoints, each breakpoint having a handler having a set of instructions for patching the incompatible application;
      (ii) accessing the list of breakpoints from the debugger dynamic link library and setting the breakpoints within the incompatible application;
      (iii) running the steps of the incompatible application through the debugger; and
      (iv) patching the incompatible application whenever a breakpoint has been reached.

2. The method of claim 1 wherein determining if the application is compatible or incompatible with the operating system comprises:
   (a) determining if at least one identifying attribute of a plurality of identifying attributes of the computer application program matches at least one identifying attribute of a plurality of identifying attributes of incompatible applications; and
   (b) if at least one of the identifying attributes matches, determining that the computer application program is incompatible, otherwise determining that the computer application program is compatible.

3. The method of claim 2 wherein determining if the application is compatible or incompatible with the operating system further comprises:
   storing identifying attributes of incompatible applications; and
   retrieving at least one of the stored identifying attributes for determining if at least one identifying attribute of a plurality of identifying attributes of the computer application program matches at least one of the stored identifying attributes of incompatible applications.

4. The method of claim 1 wherein patching the incompatible application whenever a breakpoint has been reached comprises:
   (a) calling the handler associated with the breakpoint; and
   (b) patching the incompatible application based on the instructions within the handler.

5. A computer-readable medium having computer-executable instructions for patching a computer application program including a plurality of executable steps, which, when the computer-executable instructions are executed, comprise:

(a) determining whether or not the computer application program is compatible with a computer operating system executing the computer application program; and (b) if the computer application program is determined to be incompatible with the computer operating system ("incompatible application"), starting a debugger to run the incompatible application, the debugger performing the steps of:

(i) loading a debugger dynamic link library containing a list of breakpoints, wherein each breakpoint has a handler having a set of instructions for patching the incompatible application;

(ii) accessing the list of breakpoints from the debugger dynamic link library and setting the breakpoints within the incompatible application;

(iii) running the steps of the incompatible application through the debugger; and (iv) patching the incompatible application whenever a breakpoint has been reached.

6. The computer-readable medium of claim 5 wherein determining if the application is compatible or incompatible with the operating system comprises:

(a) determining if at least one identifying attribute of a plurality of identifying attributes of the computer application program matches at least one identifying attribute of a plurality of identifying attributes of incompatible applications; and (b) if at least one of the identifying attributes matches, determining that the computer application program is incompatible, otherwise determining that the computer application program is compatible.

7. The computer-readable medium of claim 6 wherein determining if the application is compatible or incompatible with the operating system further comprises:

storing identifying attributes of incompatible applications; and retrieving at least one of the stored identifying attributes for determining if at least one identifying attribute of a plurality of identifying attributes of the computer application program matches at least one of the stored identifying attributes of incompatible applications.

8. The computer-readable medium of claim 5 wherein patching the incompatible application whenever a breakpoint has been reached comprises:

(a) calling the handler associated with the breakpoint; and (b) patching the incompatible application based on the instructions within the handler.

9. A computer system implementing a method for patching a computer application program wherein the computer system is operable to run an application having a plurality of executable steps, the method comprising:

(a) determining whether or not the computer application program is compatible with a computer operating system executing the computer application program; and (b) if the computer application program is determined to be incompatible with the computer operating system ("incompatible application"), starting a debugger to run the incompatible application, the debugger performing the steps of:

(i) loading a debugger dynamic link library containing a list of breakpoints, wherein each breakpoint has a handler having a set of instructions for patching the incompatible application;

(ii) accessing the list of breakpoints from the debugger dynamic link library and setting the breakpoints within the incompatible application;

(iii) running the steps of the incompatible application through the debugger; and (iv) patching the incompatible application whenever a breakpoint has been reached.

10. The computer system of claim 9 wherein determining if the application is compatible or incompatible with the operating system comprises:

(a) determining if at least one identifying attribute of a plurality of identifying attributes of the computer application program matches at least one identifying attribute of a plurality of identifying attributes of incompatible applications; and (b) if at least one of the identifying attributes matches, determining that the computer application program is incompatible, otherwise determining that the computer application program is compatible.

11. The computer system of claim 10 wherein determining if the application is compatible or incompatible with the operating system further comprises:

storing identifying attributes of incompatible applications; and retrieving at least one of the stored identifying attributes for determining if at least one identifying attribute of a plurality of identifying attributes of the computer application program matches at least one of the stored identifying attributes of incompatible applications.

12. The computer system of claim 9 wherein patching the incompatible application whenever a breakpoint has been reached comprises:

(a) calling the handler associated with the breakpoint; and (b) patching the incompatible application based on the instructions within the handler.

* * * * *